(12) United States Patent
Annoni et al.

(10) Patent No.: US 8,468,080 B2
(45) Date of Patent: Jun. 18, 2013

(54) SYSTEM AND METHOD FOR ADMINISTERING INVESTED FUNDS

(75) Inventors: Mark Anthony Annoni, New Hope, MN (US); William J. Hovel, Prescott, WI (US); Michael G. Phillips, West Hartford, CT (US); Donald M. Pizzella, Jr., Oakdale, MN (US)

(73) Assignee: Hartford Fire Insurance Company, Hartford, CT (US)

( * ) Notice: Subject to any disclaimer, the term of this patent is extended or adjusted under 35 U.S.C. 154(b) by 880 days.

(21) Appl. No.: 12/421,295

(22) Filed: Apr. 9, 2009

(65) Prior Publication Data

US 2010/0191668 A1 Jul. 29, 2010

Related U.S. Application Data

(60) Provisional application No. 61/147,872, filed on Jan. 28, 2009.

(51) Int. Cl.
*G06Q 40/00* (2006.01)

(52) U.S. Cl.
USPC .............. 705/36 R; 705/35; 705/37; 705/1.1; 705/30

(58) Field of Classification Search
USPC .......... 705/36 R, 1, 37, 35, 30; 714/1; 701/24
See application file for complete search history.

(56) References Cited

U.S. PATENT DOCUMENTS

| | | | |
|---|---|---|---|
| 6,278,983 B1 | 8/2001 | Ball | |
| 6,601,044 B1 | 7/2003 | Wallman | |
| 6,985,880 B1 | 1/2006 | Hodgdon et al. | |
| 7,089,206 B2 * | 8/2006 | Martin | 705/37 |
| 7,136,833 B1 | 11/2006 | Podsiadlo | |
| 7,143,061 B2 | 11/2006 | Treynor | |
| 7,480,634 B1 | 1/2009 | Cornelius | |
| 7,546,267 B2 | 6/2009 | Wallman | |
| 7,555,453 B2 | 6/2009 | Ho et al. | |
| 7,574,393 B2 | 8/2009 | Ho et al. | |
| 7,657,481 B2 | 2/2010 | Ho et al. | |
| 7,676,422 B2 | 3/2010 | Ho et al. | |
| 7,707,093 B2 | 4/2010 | O'Shaughnessy et al. | |
| 7,752,111 B2 | 7/2010 | Ho et al. | |

(Continued)

OTHER PUBLICATIONS

Wall Street Cuts Yields on Investors' Cash; Firms Shift Money From Money-Market Funds to Lower Paying Accounts: How to Switch Back. Jane J. Kim. Wall Street Journal. (Eastern Edition). New York, N.Y.: Aug. 31, 2005, p. 0.1.*

(Continued)

*Primary Examiner* — John H Holly
(74) *Attorney, Agent, or Firm* — Howard IP Law Group, PC

(57) ABSTRACT

A computer system for administering investment funds holding shares of funds includes a processor and a memory storage device in communication with the processor. The processor is adapted to access from the memory storage device data indicative of allocation targets for allocating invested funds among two or more funds in two or more investment categories; receive data indicative of current holdings of shares, subscriptions and redemptions, and including security values, prices and fund value data; calculate the current allocations among investment categories and determine any differences between the current allocations and the allocation targets; allocate the subscriptions in accordance with the differences between the current allocations and the allocation targets, and allocate the redemptions in accordance with the differences between the current allocations and the allocation targets.

29 Claims, 14 Drawing Sheets

U.S. PATENT DOCUMENTS

| | | |
|---|---|---|
| 7,756,768 B2 | 7/2010 | Ho et al. |
| 2003/0023535 A1 | 1/2003 | Hoffman |
| 2003/0028456 A1 | 2/2003 | Yolles |
| 2003/0055760 A1 | 3/2003 | Kubo |
| 2003/0093348 A1 | 5/2003 | Finn |
| 2003/0229561 A1 | 12/2003 | Wallman |
| 2004/0153387 A1 | 8/2004 | Mallozzi |
| 2004/0177020 A1 | 9/2004 | Alderman et al. |
| 2005/0154662 A1 | 7/2005 | Langenwalter |
| 2006/0100955 A1 | 5/2006 | Baldassini et al. |
| 2006/0173763 A1 | 8/2006 | O'Connor et al. |
| 2007/0005469 A1 | 1/2007 | Ho et al. |
| 2007/0005470 A1 | 1/2007 | Ho et al. |
| 2007/0061235 A1 | 3/2007 | Timmons et al. |
| 2007/0130043 A1 | 6/2007 | O'Shaughnessy et al. |
| 2008/0065532 A1 | 3/2008 | De La Motte |
| 2008/0071697 A1 | 3/2008 | Midlam et al. |
| 2008/0071698 A1 | 3/2008 | Midlam et al. |
| 2008/0140547 A1 | 6/2008 | Murphy et al. |
| 2008/0215499 A1 | 9/2008 | O'Neill |
| 2009/0099949 A1 | 4/2009 | Ho et al. |
| 2009/0099950 A1 | 4/2009 | Ho et al. |
| 2009/0299908 A1 | 12/2009 | Lindstrom et al. |
| 2010/0191636 A1 | 7/2010 | Menon |

OTHER PUBLICATIONS

E(x)Trade Canada Introduces High-Yield Cash Investment Account. Canada NewsWire. Ottawa: Nov. 21, 2006. p. 1.

Wall Street Cuts Yields on Investors' Cash; Firms Shift Money From Money-Market Funds to Lower Paying Accounts: How to Switch Back. Jane J. Kim. Wall Street Journal. (Eastern Edition). New York, NY.: Aug. 31, 2005, p. D.1.

\* cited by examiner

| File | Filter | Timing |
|---|---|---|
| 1. Security Values (Holdings)<br>　FOF Fund ID<br>　Cusip<br>　Sec Desc<br>　Market Value<br>　Accrued Income<br>　Shares<br>　Date | Filter:<br>　- Exclude where Shares = 0<br>　- Exclude only short-term<br>　　securities (0012) | 6:00PM |
| 2. Prices (list of all underlying prices)<br>　Cusip<br>　Price<br>　Date | Filter:<br>　- Include only prices on<br>　　securities within the FOFs | 6:00PM |
| 3. Fund Values (FOF Balance Sheet<br>　numbers)<br>　FOF Fund ID<br>　Total Security Value<br>　Total Accrued Income<br>　Date | | 6:00PM |
| 4. Short-Term Securities (listing only<br>　Short-term holdings)<br>　FOF Fund ID<br>　Cusip<br>　Sec Desc<br>　Market Value<br>　Accrued Income<br>　Shares<br>　Date | Filter:<br>　- Exclude where Shares = 0<br>　- Include only short-term<br>　　securities (0012) | 6:00PM |
| 5. Available Cash<br>　FOF Fund ID<br>　Cash<br>　Invest Receivable<br>　Invest Payable<br>　Date<br>　Income (H3)<br>　Subscriptions (H4)<br>　Redemptions (V5) | | 1:00AM |
| 6. Direct Money Movement<br>　FOF Fund ID<br>　Underlying Fund Cusip<br>　Tran Code (BUY or SELL)<br>　Shares<br>　Dollar Amount<br>　Date | | 6:00PM |

210 — row 1
220 — row 2
230 — row 3
240 — row 4
250 — row 5
260 — row 6

*Fig. 4*

Output Reports and Files — 405

| File | Timing |
|---|---|
| 1. Daily Order Report<br>  - One for each Fund of Fund.<br>  - Displays the trade activity that was done that day.<br>  - Could be used as the order that is faxed to your TA.<br>  - Displays all necessary info on purchases or redemptions being done for that day. | 1:15am |
| 2. Daily Wire Report *(410)*<br>  - Displays what money needs to be moved.<br>  - Used to send to Corporate Banking to instruct them where to move the money to and from which Rep Code. | 1:15AM |
| 3. Daily Allocation Report *(415)*<br>  - Displays each Fund of Funds holdings and where they are at from their projected allocations. | 1:15AM |
| 4. Underlying Funds Activity File (Sub/Red) *(505)*<br>  - File that is used by the TA (Transfer Agent) to post each Fund of Fund's trading activity within the Hartford Funds.<br>  - These are the sub and reds that are done in your TA account you have for each Fund of Fund.<br>  - Check that these were not already sent by the TA in the overnight cycle, since these were already booked<br>  - Adjust Daily TA Wires by these amounts | 1:15AM |
| 5. Inbound File for FOF Trades *(605)*<br>  - File that is used by the Accounting System to post each Fund of Fund's trades.<br>  - These are the buys or sells that were done for each FOF. | 1:20AM |
| 6. Inbound File for Underlying Hartford Fund Cap Share (Sub/Red) *(610)*<br>  - File that is used by the Accounting System to post the Capital Share activity to the Underlying Hartford Funds. | 1:20AM |
| 7. Daily Cash Adjustment File for Underlying Hartford Funds *(705)*<br>  - Adj File for the Custodian to update their TA wire so the proper underlying Hartford Funds display the correct available cash. | 1:20AM |

*Fig. 5A*

Completed by the IFS MS Access Database
using various files from the Allocation process
and files from the Accounting System

| File | Timing |
|---|---|
| 805 — 8. Daily FOF Activity Recon<br>- Daily Recon that is completed to make sure all entries have been entered into the Accounting system and looks at making sure all cash was invested. | 1:20AM |
| 810 — 9. Daily Underlying Fund Trade file for Custodian<br>- The custodian is our record keeper so we send them a daily trade file so they can keep track of our holdings. | 1:20AM |
| 815 — 10. Daily ETF Report and File for HIMCO<br>- Report that displays what ETFs that HIMCO needs to purchase<br>- These need to be posted to the Accounting System on T+0 (same day). | 1:20AM |
| 820 — 11. Daily Allocation Report for HIMCO<br>- Displays where each FOF is currently at compared to their projected allocations. | 1:20AM |
| 825 — 12. Daily Trade Report of all FOF Activity for HIMCO<br>- File displays all trades that were completed within each FOF excluding the ETFs.<br>- Since we are completing the trades with the TA HIMCO doesn't have any of this on their system so they need the file to update their systems. | 1:20AM |

*Fig. 5B*

Inputs for the DB2 Tables

Note: These are normally one time inputs. Only change these tables if HIMCO is adding new underlying funds or changing the allocations.

DB2 Table 20 (Displays each FOFs Projected Allocations)
    FOF Fund ID
    Underlying Fund Cusip
    Projected Allocation
    Settlement
    Product Code DB2 Table 21 (Displays the list of Underlying Funds that the FOFs can purchase)
    Underlying Fund Cusip
    Underlying Fund Name
    Underlying Fund NASDAQ Ticker
    Wire Group code
    Wire Rep Code (Corporate Banking)
    Underlying Fund internal Transfer Agent ID
    Bank Account number
    Fund Indicator (E=Equity, F=Fixed)

*Fig. 6*

| Fund_Name | Cusip | Sec_Desc | Prior Days Shares | Prior Days Market | Prior Days Accrued Income | Prior Days Total Mkt |
|---|---|---|---|---|---|---|
| The Hartford Conservative Allocation Fund | 78464A607 | DJ Wilshire REIT ETF | 9,691.00 | 370,486.93 | 0.00 | 370,486.93 |
| The Hartford Conservative Allocation Fund | 416645604 | Hartford Capital Appreciation Fund Class Y | 927,621.31 | 22,207,254.09 | 0.00 | 22,207,254.09 |
| The Hartford Conservative Allocation Fund | 416645653 | Hartford Disciplined Equity Fund Class Y | 826,806.76 | 7,821,591.99 | 0.00 | 7,821,591.99 |
| The Hartford Conservative Allocation Fund | 416645828 | Hartford Dividend & Growth Fund Class Y | 28,893.11 | 421,261.57 | 0.00 | 421,261.57 |
| The Hartford Conservative Allocation Fund | 416648855 | Hartford Equity Income Fund Class Y | 905,629.88 | 9,047,242.49 | 0.00 | 9,047,242.49 |
| The Hartford Conservative Allocation Fund | 416648525 | Hartford Floating Rate Fund Class Y | 1,872,834.02 | 11,742,669.32 | 8,989.75 | 11,751,659.07 |
| The Hartford Conservative Allocation Fund | 416646867 | Hartford Fundamental Growth Fund Class Y | 400,306.68 | 3,006,303.19 | 0.00 | 3,006,303.19 |
| The Hartford Conservative Allocation Fund | 416645497 | Hartford Global Growth Fund Class Y | 584,636.93 | 6,413,467.07 | 0.00 | 6,413,467.07 |
| The Hartford Conservative Allocation Fund | 416529816 | Hartford Growth Opportunities Fund Class Y | 272,380.69 | 5,172,509.23 | 0.00 | 5,172,509.23 |
| The Hartford Conservative Allocation Fund | 416645455 | Hartford High Yield Fund Class Y | 1,208,517.94 | 6,405,145.08 | 6,989.95 | 6,412,135.03 |
| The Hartford Conservative Allocation Fund | 416648848 | Hartford Income Fund Class Y | 2,292,410.34 | 19,049,929.93 | 13,983.06 | 19,063,912.99 |
| The Hartford Conservative Allocation Fund | 416648830 | Hartford Inflation Plus Fund Class Y | 1,608,747.64 | 16,393,138.41 | 0.00 | 16,393,138.41 |
| The Hartford Conservative Allocation Fund | 416645885 | Hartford International Opportunities Fund Class Y | 507,572.63 | 5,339,664.07 | 0.00 | 5,339,664.07 |
| The Hartford Conservative Allocation Fund | 416646883 | Hartford International Small Company Fund Class Y | 258,003.43 | 2,097,567.92 | 0.00 | 2,097,567.92 |
| The Hartford Conservative Allocation Fund | 416649770 | Hartford LargeCap Growth Fund Class Y | 124,561.32 | 757,332.81 | 0.00 | 757,332.81 |
| The Hartford Conservative Allocation Fund | 416648475 | Hartford Select MidCap Value Fund Class Y | 203,688.79 | 1,313,792.67 | 0.00 | 1,313,792.67 |
| The Hartford Conservative Allocation Fund | 416648160 | Hartford Select SmallCap Value Fund Class Y | 313,047.90 | 2,150,639.05 | 0.00 | 2,150,639.05 |
| The Hartford Conservative Allocation Fund | 416648822 | Hartford Short Duration Fund Class Y | 2,514,537.02 | 22,731,414.66 | 10,021.27 | 22,741,435.93 |
| The Hartford Conservative Allocation Fund | 41664L583 | Hartford Strategic Income Fund Class Y | 1,012,168.91 | 7,449,563.18 | 6,556.78 | 7,456,119.96 |
| The Hartford Conservative Allocation Fund | 416645752 | Hartford Total Return Bond Fund Class Y | 1,904,343.64 | 17,957,960.54 | 10,299.72 | 17,968,260.26 |
| The Hartford Conservative Allocation Fund | 416646701 | Hartford Value Fund Class Y | 616,752.22 | 5,199,221.24 | 0.00 | 5,199,221.24 |
| The Hartford Conservative Allocation Fund | 73936T573 | PowerShares EM Sovereign Debt ETF | 5,925.00 | 132,127.52 | 0.00 | 132,127.52 |
| The Hartford Conservative Allocation Fund | 78463X863 | SPDR DJ Wilshire International Real Estate ETF | 12,082.00 | 336,121.24 | 0.00 | 336,121.24 |

Total Equity 41.23%
Total Fixed 58.77%

Total Portfolio 100%    173,516,404.20    56,840.53    173,573,244.73

*Fig. 7A*

| Projected Allocation 7045 | Last Night Allocation 7050 | Current Allocation Post Cashflow 7055 | Difference between Projected and Post 7060 | Date of Info | Daily Cash Flow (Net Inflow if Positive) 7065 |
|---|---|---|---|---|---|
| 0.88% | 0.21% | 0.21% | 0.67% | January 6, 2009 | |
| 11.73% | 12.80% | 12.81% | 1.08% | January 6, 2009 | |
| 3.46% | 4.51% | 4.51% | 1.05% | January 6, 2009 | |
| 0.00% | 0.24% | 0.24% | 0.24% | January 6, 2009 | |
| 5.45% | 5.21% | 5.22% | 0.23% | January 6, 2009 | |
| 7.44% | 6.77% | 6.77% | 0.67% | January 6, 2009 | |
| 3.10% | 1.73% | 1.73% | 1.37% | January 6, 2009 | |
| 3.10% | 3.70% | 3.70% | 0.60% | January 6, 2009 | |
| 3.10% | 2.98% | 2.98% | 0.12% | January 6, 2009 | |
| 3.05% | 3.69% | 3.70% | 0.65% | January 6, 2009 | |
| 11.29% | 10.98% | 10.99% | 0.30% | January 6, 2009 | |
| 9.76% | 9.45% | 9.46% | 0.30% | January 6, 2009 | |
| 4.13% | 3.08% | 3.08% | 1.05% | January 6, 2009 | |
| 0.00% | 1.21% | 1.21% | 1.21% | January 6, 2009 | |
| 0.00% | 0.44% | 0.44% | 0.44% | January 6, 2009 | |
| 0.00% | 0.76% | 0.76% | 0.76% | January 6, 2009 | |
| 0.00% | 1.24% | 1.13% | 1.13% | January 6, 2009 | -184,085.99 |
| 12.84% | 13.10% | 13.11% | 0.27% | January 6, 2009 | |
| 3.40% | 4.29% | 4.30% | 0.90% | January 6, 2009 | |
| 11.22% | 10.35% | 10.36% | 0.86% | January 6, 2009 | |
| 4.05% | 3.00% | 3.00% | 1.05% | January 6, 2009 | |
| 1.00% | 0.08% | 0.08% | 0.92% | January 6, 2009 | |
| 1.00% | 0.19% | 0.19% | 0.81% | January 6, 2009 | |
| 100.00% | 100.00% | 100.00% | 16.67% | | -184,085.99 |

*Fig. 7B*

SYSTEM AND METHOD FOR ADMINISTERING INVESTED FUNDS

CROSS-REFERENCE TO RELATED APPLICATIONS

This application claims the benefit of U.S. Provisional Patent Application Ser. No. 61/147,872, filed Jan. 28, 2009, the entire disclosure of which is incorporated by reference herein.

FIELD

The present disclosure relates to computer systems, and particularly to computer systems for use in the financial services industry, and particularly for use in administration of investment funds.

BACKGROUND

A managed investment fund may hold investments in the form of shares in several mutual funds, exchange traded funds, or other funds or investments. Such a managed investment fund may also be referred to as a fund of funds. The managed investment fund allocates investments among various funds, generally with different investment objectives, based on advice from investment managers. In a simplified example, an investment manager may recommend that a certain percentage of investments be held in a particular category, such as equity funds, and the remaining percentage held in fixed income funds. On the opening of the fund, the fund assets will likely be invested in accordance with the advice. The shares of each underlying fund are marked to market on a daily basis. As the values of shares of each underlying fund change, the percentage of each investment category varies from the recommendations of the investment manager.

Periodic rebalancing of the fund assets is performed in order to update the percentages in each investment category to match the recommended investment allocations. Rebalancing requires sales of shares in underlying funds in the category that is in excess of the recommended allocation, and use of the proceeds of the sales to purchases shares in underlying funds in the category that is below the recommended allocation. Rebalancing involves transactions and use of various resources, including computer system resources and personnel time.

SUMMARY

In an embodiment, a computer system for administering investment funds holding shares of mutual funds has a processor and a memory storage device in communication with the processor. The processor is adapted to: access from the memory storage device data indicative of a percentage allocation target for each of the mutual funds; receive data indicative of current holdings of shares, subscriptions and redemptions and including security values, prices and mutual fund value data; calculate the current allocation for each of the mutual funds and determine any differences between the current allocations and the allocation targets; allocate the subscriptions to the mutual funds commencing with a fund ranked at a greatest level below its target allocation and, if subscriptions remain after the allocation to the fund ranked at the greatest level below its target allocation, continue to allocate the subscriptions to mutual funds ranked at successively lower levels below their respective target allocations until the first of all subscriptions are allocated or no further funds are ranked below their respective target allocations; allocate the redemptions to the mutual funds commencing with a fund ranked at a greatest level above its target allocation, and, if redemptions remain after the allocation to the fund ranked at the greatest level above its target allocation, continue to allocate the redemptions to funds ranked at successively lower levels above their respective target allocations until the first of all redemptions are allocated or no further funds are ranked above their respective target allocations.

In an embodiment, a computer system for administering investment funds holding shares of funds has a processor and a memory storage device in communication with the processor. The processor is adapted to: access from the memory storage device data indicative of allocation targets for allocating invested assets among two or more funds in two or more investment categories; receive data indicative of current holdings of shares, subscriptions and redemptions and including security values, prices and fund value data; calculate the current allocations among investment categories and determine any differences between the current allocations and the allocation targets; allocate in a first allocation step one of the subscriptions and the redemptions in accordance with the differences between the current allocations and the allocation targets, and allocate in a second allocation step the other of the subscriptions and the redemptions in accordance with the differences between the current allocations and the allocation targets.

In an embodiment, a computer-implemented method for administering investment funds holding shares of funds includes: accessing by the processor from a memory storage device data indicative of allocation targets for allocating invested funds among two or more funds in two or more investment categories; receiving by the processor data indicative of current holdings of shares, subscriptions and redemptions, and including security values, prices and fund value data; calculating by the processor the current allocations among investment categories and determine any differences between the current allocations and the allocation targets; allocating by the processor in a first allocation step one of the subscriptions and the redemptions in accordance with the differences between the current allocations and the allocation targets, and allocating in a second allocation step the other of the subscriptions and the redemptions in accordance with the differences between the current allocations and the allocation targets.

In an embodiment, a computer system for administering investment funds holding shares of funds has a processor and a memory storage device in communication with the processor. The processor is adapted to: access from the memory storage device data indicative of allocation targets for allocating invested funds among two or more funds in two or more investment categories; receive data indicative of current holdings of shares, subscriptions and redemptions, and including security values, prices, fund value data, and directed money movement data; process any transactions in accordance with the received directed money movement data; calculate the current allocations among investment categories and determine any differences between the current allocations and the allocation targets; and allocate subscriptions and redemptions in accordance with the differences between the current allocations and the allocation targets.

In an embodiment, a computer system for administering investment funds holding shares of funds, the funds including first shares of funds having share values updated at a first interval and second shares having share values updated more frequently than the first interval, has a processor and a memory storage device in communication with the processor. The processor is adapted to: access from the memory storage device data indicative of allocation targets for allocating invested funds among two or more funds in two or more investment categories; receive data indicative of current holdings of shares, subscriptions and redemptions and including security values, prices, and fund value data; calculate the current allocations among investment categories and determine any differences between the current allocations and the allocation targets; allocate subscription and redemptions in accordance with the differences between the current allocations and the allocation targets; and provide an output signal indicative of the allocated subscriptions and redemptions for the first shares and an output signal indicative of allocated subscriptions and redemptions for the second shares. The system further includes an investment advisor computer system for receiving the output signal indicative of the allocated subscriptions and redemptions for the second shares; providing an output signal indicative of instructions to a broker for purchase or sale of one or more of the second shares; receiving a signal from the broker indicative of transactions for purchase or sale of one or more of the second shares; and providing an output signal indicative of the transactions for purchase or sale of the one or more of the second shares.

BRIEF DESCRIPTION OF THE DRAWINGS

FIG. 4 is a table illustrating fields of certain files referenced in FIG. 2.

FIG. 5A is a table illustrating fields of further files referenced in FIG. 2.

FIG. 5B is a table illustrating fields of further files and summarizing reports referenced in FIG. 2.

FIG. 6 is a table illustrating fields of tables referenced in FIG. 2.

FIGS. 7A and 7B are a table illustrating exemplary allocation targets and actual allocations in accordance with an embodiment.

DETAILED DESCRIPTION

It is to be understood that the figures and descriptions of embodiments of the present invention have been simplified to illustrate elements that are relevant for a clear understanding of the present invention, while eliminating, for the purpose of clarity, many other elements found in typical computer systems and methods for administration of investment funds and related systems and methods. Those of ordinary skill in the art, for example in the field of information technology for the financial services industry, may recognize that other elements and/or steps are desirable and/or required in implementing embodiments of the present invention. However, because such elements and steps are well known in the art, and because they do not facilitate a better understanding of the present invention, a discussion of such elements and steps is not provided herein.

A challenge recognized by the inventors is that of seeking to maintain the allocation of underlying funds within a fund of funds at or near a target allocation, for example, in accordance with allocations to certain investment categories, while avoiding unnecessary underlying fund purchase and sale transactions. A further challenge recognized by the inventors is of coordinating an allocation of underlying funds to a target allocation when all holdings in one or more underlying funds are liquidated, or when purchases are made of underlying funds not previously held by the fund of funds. A further challenge recognized by the inventors is maintaining proper allocations in a fund that holds both underlying mutual funds, the share price of which is determined only on a daily basis when the shares are marked to market based on the closing prices of the securities held by the mutual fund, and shares that change in price throughout the trading day, such as shares of exchange traded funds (ETFs).

Figure 1:
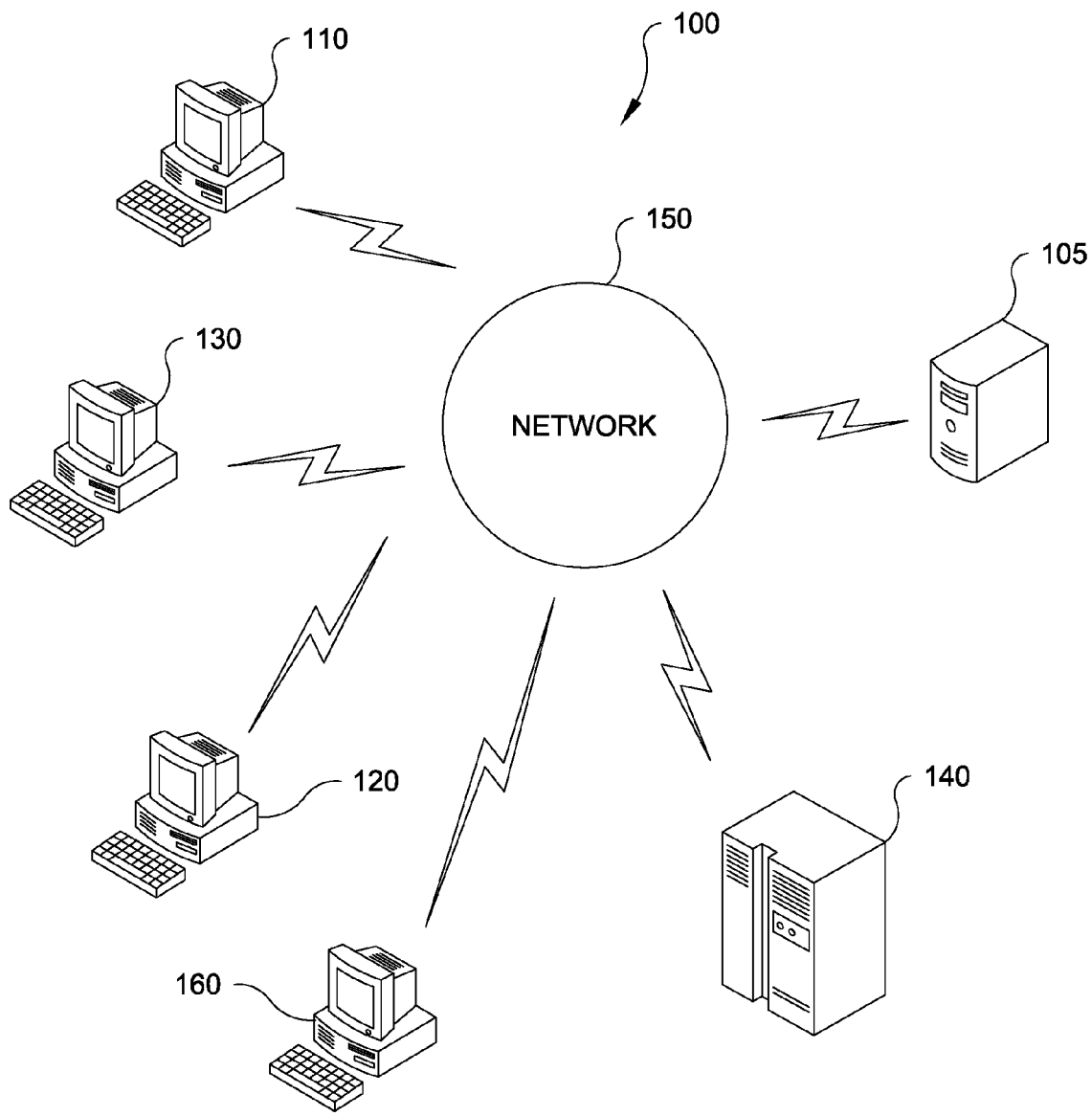
FIG. 1 is a schematic diagram showing exemplary computer systems for implementation of a method and system of the invention.

In FIG. 1, an exemplary system 100 for administration of investment funds including exemplary computer systems linked via a network 150 is shown. It will be appreciated that the computer systems may be connected via the Internet, one or more LANs, WANs, and other networks and systems. Each computer system may include one or more processors and memory devices. The memory devices may include computer readable media for storing computer programs in the form of instructions, which, when executed by a processor, cause the processor to perform specified steps. Mainframe computer system 140 communicates with computer system 105, which may be a server operating as an accounting system by executing one or more computer programs useful in accounting. Transfer agent computer system 110 may perform the functions generally performed by transfer agent computer systems and known in the field of information technology for the financial services industry, including, by way of example, for tracking transfers of shareholder fund shares. Custodian computer system 120 may perform the functions generally performed by custodian computer systems and known in the field of information technology for the financial services industry, including, by way of example, for maintaining accurate listings of securities held on behalf of customers of the custodian. An investment finance support computer system 130 may perform the functions generally performed by an investment finance support computer system in the field of information technology for the financial services industry, including, by way of example, generating reports for an investment advisor and for a custodian. An investment advisor computer system 160 may perform the functions generally performed by an investment advisor computer system in the field of information technology for the financial services industry, including, by way of example, communicating with a brokerage computer system (not shown) in connection with dispatching instructions for purchases and sales of securities, including shares of ETFs, and receiving reports as to the purchases and sales.

Figure 2A:
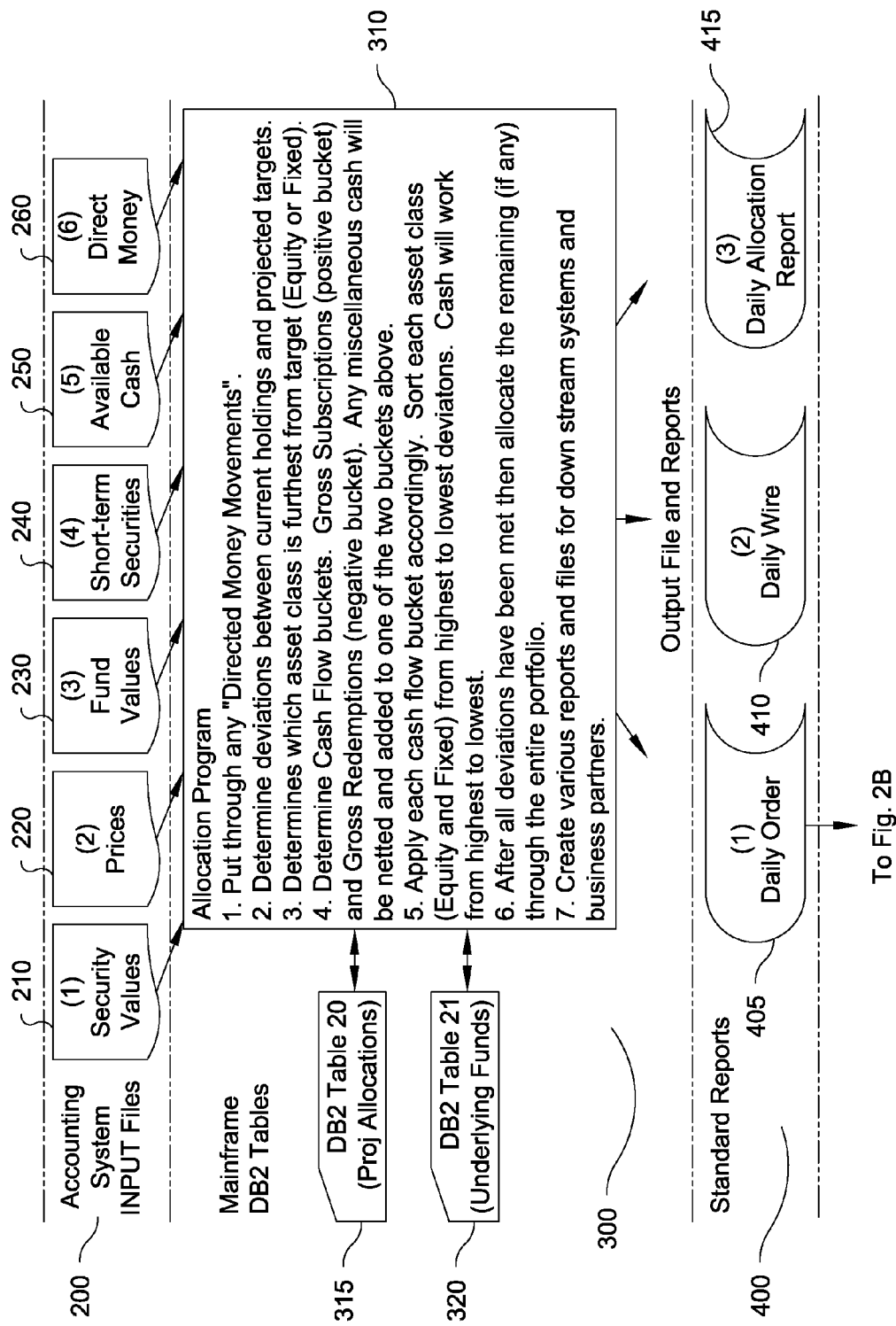
FIG. 2 is a schematic diagram illustrating a method and system of an embodiment.
Figure 2B:
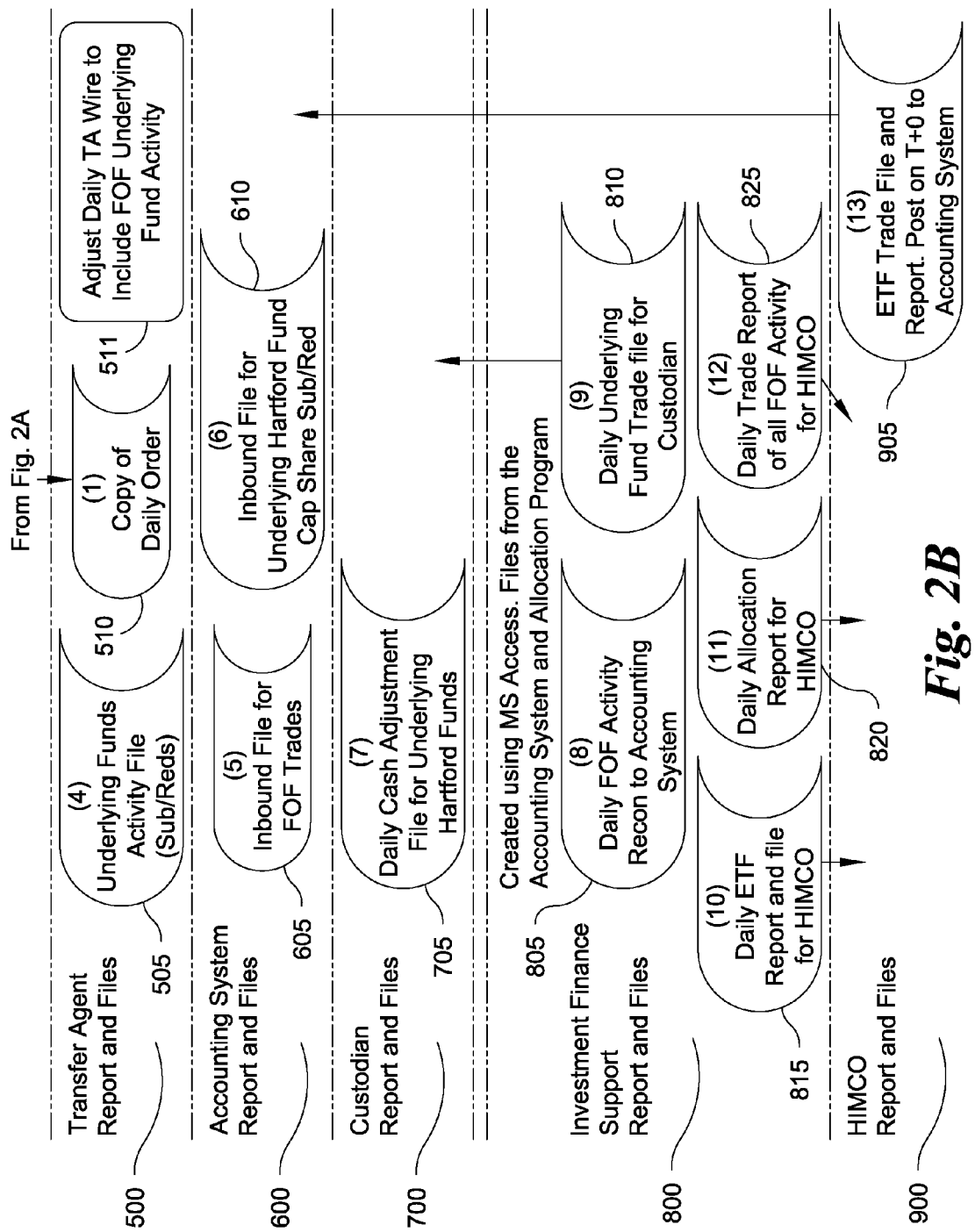

Referring to FIG. 2, a high level diagram is shown of an embodiment of a method for determining allocations of funds in connection with administration of investment funds. The method may be applicable to investment funds that invest exclusively in mutual funds or to investment funds that invest both in mutual funds and securities the price of which is updated more frequently, such as shares of ETFs. The steps may be performed by the computer systems illustrated in FIG. 1, for example. Accounting system 200, which may be implemented by an accounting system computer having a processor executing instructions stored in a computer readable memory, provides input files that may be stored in memory locations of memory devices of the accounting system computer. The input files may be transmitted to a mainframe system, such as by batch files on a periodic basis, or may be furnished in response to a request from the mainframe system. The process may be implemented on a periodic basis corresponding to the frequency that the underlying holdings of mutual funds are marked to market. In an implementation, the underlying holdings of the mutual funds are marked to market on a daily basis. Accordingly, the process flow of FIG. 2 may be performed on a daily basis.

The input files may include security values file 210 that indicate the current holdings of a fund. A price file 220 may provide a price of each security held within the fund. A fund values file 230 may include for each fund the total value of the underlying funds. A short term securities file 240 may include securities held for a short term, e.g., holdings held for a period less than an applicable threshold between short term and long term holdings. An available cash file 250 may indicate an amount of cash held by the fund. A direct money file 260 may include an underlying fund to be sold or purchased and dollar amount and/or share information. The direct money file 260 may reflect instructions to liquidate holdings of an underlying fund completely or to purchase shares of a fund for a first time. The direct money file 260 may reflect instructions to purchase a certain dollar value of shares of a fund or to sell a certain dollar value of shares of a fund.

Mainframe 300 may receive the foregoing files from accounting system 200 and cause the values to be stored, for example, in one or more memory locations. They may be stored in files created in a relational database management system, such as the IBM DB2 system, and further such as the IBM DB2 system for a System/360 series mainframe. An allocation program 310 may be stored in a computer-readable memory of mainframe 300, and may include instructions which, when executed by a processor, cause the processor to perform certain steps. The processor is caused by the allocation program to execute any transactions that are set forth in direct money files received from the accounting system. The execution of transactions includes placing sell orders and buy orders.

The processor then determines, based on the dollar value of the current holdings, in each fund, and the assignment of each fund to an asset category, the percentages of each asset category. The percentages may then be saved in a memory device of the mainframe. These percentages may be compared to target percentages. The resulting differences may be compared to one another, and the investment categories may be ranked from greatest to least difference. Asset categories may include any type of asset category known to those of skill in the art or that may be developed, including by way of example, equity, fixed, domestic, foreign, large cap, small cap, selected industries, and other categories.

The processor may determine, based on the dollar values of the holdings in each fund, the percentages of values held in each underlying fund. The percentages may then be saved in a memory device of the mainframe. The mainframe may also include target percentages for each underlying fund. The mainframe processor may calculate differences between the target percentages and the actual percentages, and rank the underlying funds from greatest to least difference.

The processor may determine the gross dollar amount of subscriptions, which may be the gross sum of all subscriptions to the funds. The gross dollar amount may be a sum of individual subscription information. The processor may add to the gross dollar amount of subscriptions a gross dollar amount of miscellaneous cash; miscellaneous cash may include any cash held by the fund of funds that is not required for other purposes, and may be indicated in the available cash report shown in FIGS. 2 and 4. In an embodiment, the gross dollar amount of subscriptions that is allocated as described below may include the sum of shareholder subscriptions and miscellaneous cash. The gross dollar amount may be stored in a memory device of the mainframe. The processor may determine a gross dollar amount of redemptions. The gross dollar amount of redemptions may be a sum of all the redemptions from all the funds.

The processor may then identify the investment category that is the greatest amount below its target allocation. The underlying funds within the identified investment category may be ranked from the greatest level below their respective targets to the least. The processor may then determine allocations of the gross shareholder subscriptions to the underlying funds. The determination by the processor results in an allocation of the difference between the target allocation and the current market value, or up to the amount of the gross shareholder subscriptions, if the amount of the gross shareholder subscriptions is less than the difference between the market value and the target allocation. A dollar amount of the underlying fund to be purchased is then stored in a memory location accessible to the processor. The dollar amount is associated with a fund identifier. The processor then determines if there is a balance of gross shareholder subscriptions. If there is not a balance, then the processor proceeds to processing gross shareholder redemptions. If there is a balance of gross shareholder subscriptions, then the processor proceeds to determine if there are additional underlying funds below the target allocation. If there are no additional underlying funds below the target allocation, then the processor proceeds to allocating the balance of gross shareholder subscriptions among the underlying funds. By way of example, the balance may be allocated among the underlying funds in accordance with the target allocation of each of the underlying funds.

If there are further underlying funds below the target allocation, the amount of gross shareholder subscriptions less the amount allocated to the first underlying fund is allocated to the next underlying fund, and the process flow continues until either the gross shareholder subscriptions or the underlying funds below their target allocations are exhausted.

In an embodiment, target allocations on a fund by fund basis are employed, and not on an investment category basis. In that embodiment, all underlying funds are ranked by deviation from the target, without regard to the investment category of the underlying fund.

In an embodiment, target allocations on an investment category basis only are employed. Subscriptions are allocated among underlying funds within each investment category on a basis of even allocation to each underlying fund, for example.

The processor then proceeds to process the gross shareholder redemptions. The processor may determine the investment category that has the greatest deviation above its target. The processor may then rank the underlying funds within that investment category by deviation above target, in order from greatest to least. The gross shareholder redemptions then may be allocated commencing with the underlying fund having the greatest deviation above the target allocation. A redemption order may be saved, in the lesser of the dollar value of the total shareholder redemptions or the dollar value of the differential between the first underlying fund's target value and the first underlying fund's actual market value. If the gross shareholder redemption value is fully allocated, then the process flow may proceed to creation of reports. If a balance of the gross shareholder redemptions remains, then the redemption amount is applied to the next underlying fund. If the underlying funds of the first investment category are completed and a redemption amount remains, then the redemption amount may be applied to a next investment category that is above its target allocation. In the next investment category, the underlying funds are ordered by difference above target value. The redemption amount is applied to each underlying fund until all underlying funds are redeemed. The process flow may be completed.

In an embodiment, the process flow may be performed iteratively until a suitable level of accuracy is obtained. In an embodiment, an algebraic formula may be developed including the gross redemption amount, the gross subscription amount, and miscellaneous cash flow, as well as the differences between target and actual amounts, to calculate allocations to provide greater accuracy in allocation.

In an embodiment, one or more investment categories may be above target, while at least some of the underlying funds in that investment category may be below target. Similarly, in an embodiment, one or more investment categories may be below target, while at least some of the underlying funds in that investment category may be above target. In an embodiment, a processor may allocate a gross redemption amount, up to an amount that an investment category is above target, among the underlying funds in that category that are above target, proportionally according to total holdings, for example, and not allocate a gross redemption amount to the underlying funds that are below target. Similarly, in an embodiment, a processor may allocate a gross subscription amount, up to an amount that an investment category is below target, only among underlying funds in the category that are below target.

Figure 3:
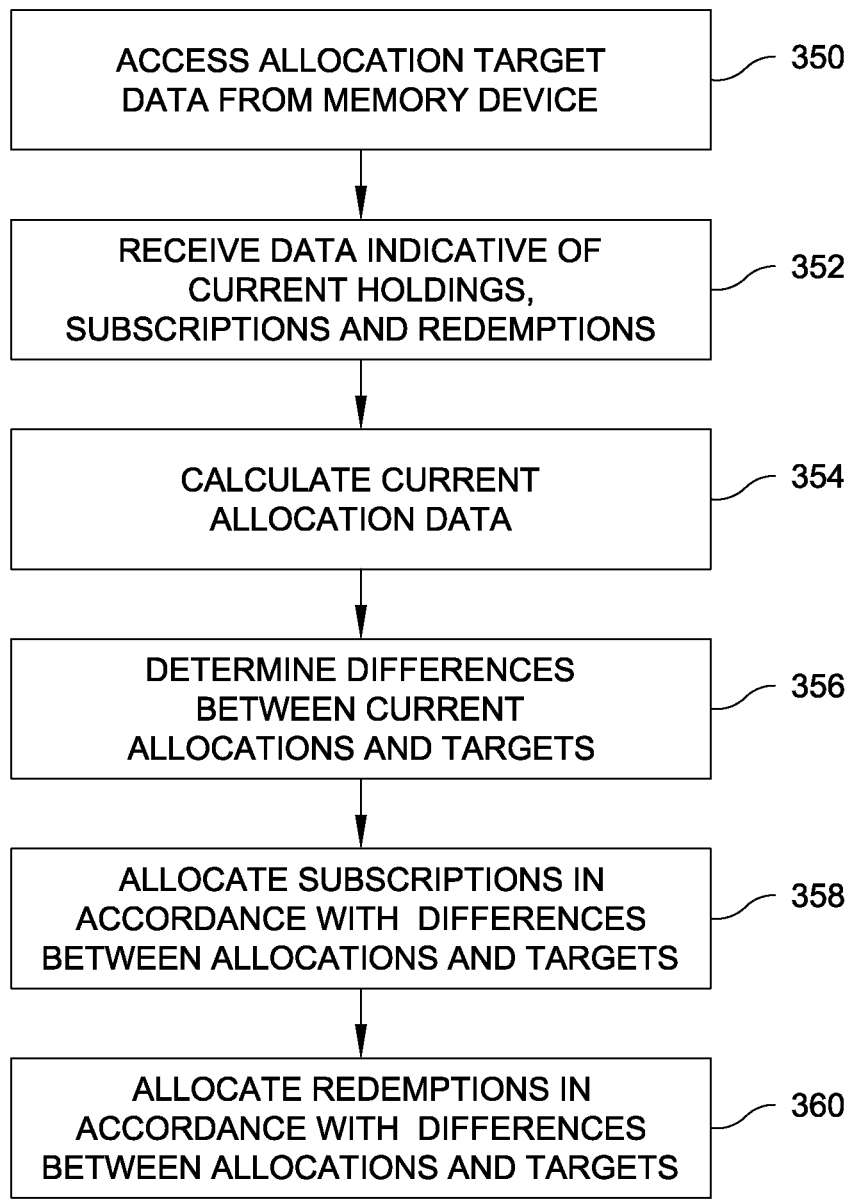
FIG. 3 is a process flow diagram illustrating a method for allocation in accordance with an embodiment of the invention.

Referring to FIG. 3, a process flow of an embodiment will be discussed. In the process flow, processor is adapted to access 350 from the memory storage device data indicative of allocation targets for allocating invested funds among two or more underlying funds in two or more investment categories; receive 352 data indicative of current holdings of shares, miscellaneous cash flow, subscriptions and redemptions, and including security values, prices and fund value data; calculate 354 the current allocations among investment categories and determine 356 any differences between the current allocations and the allocation targets; allocate 358 in a first allocation step one of the subscriptions and redemptions in accordance with the differences between the current allocations and the allocation targets, and allocate 360 in a second allocation step the other of the subscriptions and redemptions in accordance with the differences between the current allocations and the allocation targets.

Figure 9:
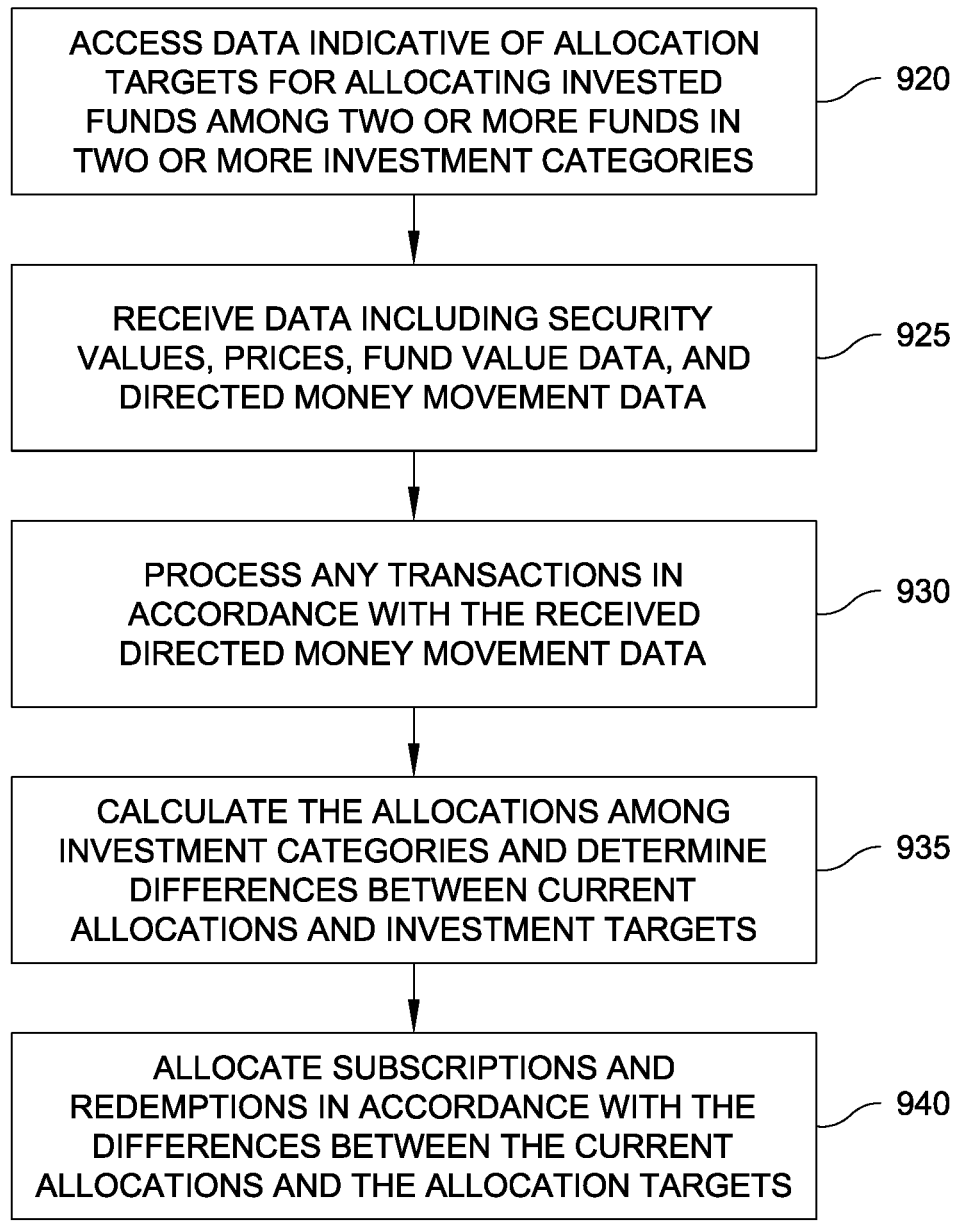
FIG. 9 is a process flow diagram illustrating a process of allocating subscriptions and redemptions in an embodiment.

Referring to FIG. 9, an embodiment will be discussed in which a processor, such as a mainframe processor executing instructions contained in the allocation program, may calculate a net amount of redemptions and subscriptions in a daily cycle. The processor may then allocate the net redemptions or net subscriptions, starting with the suitable category or underlying fund, depending on whether the process starts with a category or underlying fund over its target allocation, in the case of net redemptions, or with a category or underlying fund under its target allocation, in the case of net subscriptions. In an embodiment, the direct money transfers, such as the sale of shares of a fund and purchase of shares of other funds with the proceeds, may be performed prior to the step of allocation based on net redemptions or net subscriptions. The processor may access 920 from a memory storage device data indicative of allocation targets for allocating invested funds among two or more underlying funds in two or more investment categories. The processor may receive 925 data indicative of current holdings of shares, miscellaneous cash flow, subscriptions and redemptions; the received data may include security values, prices, fund value data, and directed money movement data. The processor may process 930 any transactions in accordance with the received directed money movement data. The processing of transactions in accordance with the received directed money movement data may include a sale of all holdings of an underlying fund. The processing of transactions in accordance with the received directed money movement data may include a purchase of shares of an underlying fund not previously included in the fund of funds. The processor may calculate 935 the current allocations among investment categories and determine any differences between the current allocations and the allocation targets. The processor may allocate 940 subscriptions and redemptions in accordance with the differences between the current allocations and the allocation targets. The allocation may be an allocation of net subscriptions or net redemptions for that day's cycle.

In an embodiment, allocations to both mutual funds and ETFs may be performed by allocation of a net redemption amount.

In an embodiment, the allocations may be stored in a database table. The processor may execute instructions contained in the allocation program to generate reports. A category of reports called standard reports 400 may include daily order reports 405, daily wire report 410, and daily allocation report 415. Exemplary data in each of these files are shown in FIG. 5A, for example. The daily order report 405 includes all of the purchases and sales of shares for that day. The daily wire report 410 may be provided to a banking system to provide instructions for moving funds between accounts. The daily allocation report 415 may be provided to indicate the current allocations, and may also include data indicative of purchases and sales of underlying funds.

A category of reports created for the transfer agent is shown at 500. An underlying funds activity file 505 may include purchase and sale information to provide fund managers with advance notice of the cash flow into the underlying funds. As indicated at 511, the transfer agent wire is adjusted to include underlying fund activity in the fund of funds (FOF). The transfer agent may also receive a copy of daily order report 405. The reports created for the accounting system are shown at 600. The reports for the accounting system include the inbound file 605 for the fund of fund trades. The accounting system may employ those reports in determining the fund holdings. The reports for the accounting system also include inbound files 610 for underlying fund capital shares for each internal or related fund.

Reports and files for a custodian are shown at 700. The files for the custodian include a daily cash adjustment file 705. This permits the custodian to obtain information on an accelerated schedule relative to prior art processes.

Reports and files for use by internal investment finance support are shown generally at 800. These reports may be generated from a database, such as a database implemented in the Microsoft Access program or another program, and stored in memory on a computer system. The data incorporated in the database may be obtained from data stored in the mainframe by the processor executing instructions from the allocation program, and data stored by an accounting system. The reports may include a daily fund of funds activity reconciliation report 805 that is provided to the accounting system for updating and checking changes in fund holdings. The reports may further include a daily underlying fund trade file 810 that is provided to the custodian. The files and reports may further include a daily ETF report 815 of ETF order provided to an investment advisor. The term "HIMCO" appearing in the figures may be replaced by any investment advisor. The files and reports may further include a daily allocation report 820 that is provided to an investment advisor. The files and reports may further include a daily trade report 825 of all fund of fund activity, including purchases, sales, dividends and any other activities, which is furnished to an investment advisor.

Reports generated by an investment advisor are shown generally at 900. In FIG. 2, the only report shown is an ETF trade file and report 905 which is provided to the accounting system.

In an embodiment, the method and system may include steps and features particularly for implementation of trades relating to ETFs. In an ETF, unlike a mutual fund, the share value is updated throughout the day. Accordingly, allocations are made on the closing price at the end of the day, but since trades cannot be executed until the following day, the sale or purchase price of ETF shares may vary from, and indeed will ordinarily vary from, the share value on which the allocations are calculated. In addition, ETF transactions may be executed through a broker, and funds for the broker's commission must be considered. Accordingly, in an ETF transaction, an amount of funds is allocated for the transaction, and the broker executes trades using available funds.

Referring now to FIG. 4, exemplary data content of input files, indicated generally at 200 in FIG. 2, will be discussed. Security values file 210 may include an identification of the fund, a corresponding standardized identification of each underlying fund, such as by CUSIP number, a description of the security, which may be a text file, a market value of the shares held, the accrued income in shares of the underlying fund, the number of shares, and the date. The file may be filtered to exclude any securities where the number of shares is 0, and any short-term securities. Short-term securities are those held for a short term as defined in accordance with relevant standards and practices. Price file 220 may include a standardized identification of each underlying share in each fund by CUSIP number, for example, the price, such as at the close of trading, and the date. Fund values file 230 may include the fund of funds fund identification, the total security values for the fund of funds, the total accrued income for the fund of funds, and the date. Short term securities file 240 may include the fund of funds fund identification, the CUSIP or other applicable identification number for each short-term security, a security description, a market value, the accrued income, the number of shares of the security held, and the current date. The file does not include securities where the current number of shares is 0. Available cash file 250 includes a fund of funds fund identification, the amount of cash, an indication of the investment receivables, an indication of investment payables, the date, any income, the amount of subscriptions, the amount of redemptions and any other miscellaneous cash flow.

The direct money file 260 includes the fund of funds fund identification, the underlying fund identification (e.g., CUSIP), a transaction code, such as BUY or SELL, a number of shares to be bought or sold, a dollar amount, and the date.

Referring now to FIG. 5A, the reports and files that are provided by a processor executing instructions stored in a computer readable medium and constituting the allocation program will be discussed. Daily order report 405 includes all trade data for each fund of funds. The trade data includes identifying, for each fund that is the subject of a transaction, the identification of the underlying fund, the type of transaction (buy or sell), the number of shares, and the dollar value of the transaction. The daily wire report 410 is provided to indicate money movements required from bank accounts to provide funds for purchases, for example, and may include representative codes to associate particular fund movements, for example. The daily allocation report 415 displays the holdings of each fund of funds and its separation from its allocations. An exemplary daily allocation report for one fund of funds is provided at FIGS. 7A and 7B, which will be discussed below.

Referring again to FIG. 5A, the underlying funds activity file 505 includes, for each account of each fund of funds with the transfer agent, and the shareholder subscription and redemption activity for each underlying fund. The file includes a transfer agent account for the fund of funds, an identification of each security (e.g., CUSIP) that is being bought or sold, and may include dollar amounts as well. A check should be made that the transactions were not already sent by the transfer agent in the overnight cycle, as the transactions were already booked. The daily transfer agent wires are adjusted by the amounts of this shareholder subscription and redemption activity for each underlying fund. The inbound file 605 for fund of fund trades identifies all buy and sell activity by fund of funds, and includes the security bought or sold, the number, and may include dollar amounts. The inbound file 610 for the capital share activity for each underlying fund is used by accounting to reflect the proper shareholder activity. The inbound file 610 is advantageous for fund managers, as inbound file 610 is provided more quickly than reports of shareholder activity would be provided in the ordinary course.

The daily cash adjustment file 705 for Hartford funds is provided to fund custodians to update their trading agent wire.

Referring to FIG. 5B, the daily fund of funds activity reconciliation report 805 is provided to the accounting system to confirm that all trades have been accomplished and that all cash has been invested. The daily underlying fund trade file 810 lists the current holdings after trades and is provided to the custodian for verification of the securities held. The daily ETF report and file 815 is provided specifically for the ETF shares. As the ETF shares are purchased through a broker, these transactions are not handled by the transfer agent, and accordingly a separate data file is provided containing ETF transfer information. The ETF data file may contain data items such as: an investment advisor acronym, an underlying fund CUSIP, a ticker symbol, an underlying fund name, a trade amount (in dollars or shares); a transaction code (e.g., sell or buy), a number of current shares, a current shares market value, a market price, the date, and a group code related to the fund of funds. An ETF data file may alternatively include the following fields: an amount of a trade, a portfolio identifier, a settlement date, a trade date, a currency, and a notation as to the type of trade.

In an implementation, instructions associated with an ETF purchase or sale may include an instruction to purchase or sell a certain dollar value of shares, rather than a certain number of shares. The determination of the dollar value may also include employing an algorithm that provides for a commission, such as a broker's commission, associated with the purchase or sale.

In an embodiment, a separate data file applicable to securities that trade during the day may include ETFs or other types of securities, such as individual company stocks. In an embodiment, a separate data file applicable to other types of investments that are marked to market on a different schedule may be applicable.

When the investment advisor receives the results of ETF trades, the results are provided to an accounting system. The results may include that not all of the cash earmarked for the ETF share purchases was used. The additional cash is no longer earmarked for ETF share purchases, and is returned into the category of miscellaneous cash flow available.

In connection with ETF purchases and sales, a method tracks an amount of cash earmarked for ETF trades. The cash earmarked for ETF trades may be a separate category from cash generally available to the fund. An amount of cash earmarked for ETF trades is stored in memory of the accounting system, for example, and may also be provided to the mainframe and taken into consideration by the allocation program. This is advantageous in that cash for fund purchases may be deducted from a fund earlier than cash for ETF trades; the cash transfers for the ETF trades may occur at the time of settlement. A time of settlement may be later in the day or not until a subsequent day. For example, the ETF purchases may use a T+3 settlement cycle, under which settlement is made three days after the transaction. However, the investment advisor provides the purchase information to the accounting system on the same day, i.e., on a T+0 basis.

As noted above, in an embodiment in which funds are invested in other type of exchange traded securities, the methods and systems applicable to ETFs may be employed. By way of example, a record may be created in the accounting system and other systems that a certain amount of cash is earmarked for equity purchases or purchases of other types of assets that have been purchased, but not yet settled.

The daily allocation report 820 for the investment advisor provides a listing of the target allocations of each fund of fund and the current allocations of each fund of fund, along with a listing of the deviation. The daily trade report 825 lists all fund of fund activities, but may exclude ETF funds already covered in the ETF report 815. The daily trade report 825 is provided to the investment advisor. An investment advisor computer system may include files recording all of the trades.

Referring to FIG. 6, input data for tables in a relational database, such as in tables 315, 320 of FIG. 2, is shown. The data may be input only on initial set up, and then if there are changes in underlying funds or allocations. The data may be independent of amounts currently invested in various underlying funds. Table 315 may include projected allocations, and the data inputs may include the fund of funds identification, a CUSIP or other indicator for each security, a projected allocation percentage for the underlying fund, a settlement date of the underlying fund, and a product code for the fund. Table 320 may include a list of underlying investments that each fund of funds may purchase. The data may include a CUSIP or other identifier for each underlying fund, a fund name, a market identifier (e.g., NASDAQ tracker) for each underlying fund, a wire group code, a wire rep code, an internal transfer agent ID for the underlying fund, a bank account number, and an indicator of the investment category to which the underlying fund is assigned.

Referring to FIGS. 7A and 7B, an exemplary table is shown including data from a daily allocation report 820 provided to the investment advisor. Each row in the table represents the data associated with one of the underlying funds in the fund of funds. The name of the fund of funds is given in column 7010. The identifier for the underlying investment, and in this example a CUSIP, is given in column 7015. A description of the security, such as the name of the underlying investment, is shown in column 7020. The number of shares owned on the prior day is given in column 7025. The market value of the shares owned on the prior date is given at column 7030. The accrued income associated with the investment is shown at column 7035. The total market value on the prior day, including both shares and market value is given in column 7040. Turning to FIG. 7B, the projected, which is used as a synonym for "target," allocation for each fund is shown at column 7045. The percentage allocated to that fund on the prior day is shown at column 7050. A current allocation after completion of the determined allocations for that day is shown in column 7055; as this calculation is completed prior to receipt from the broker of the results of ETF trades, this allocation is approximate. The difference between the target and the new allocation is shown in column 7060. The date is shown in column 7065, and a net cash inflow is shown on the right; here, one investment has been sold, resulting in a net outflow to one investment.

Figure 8:
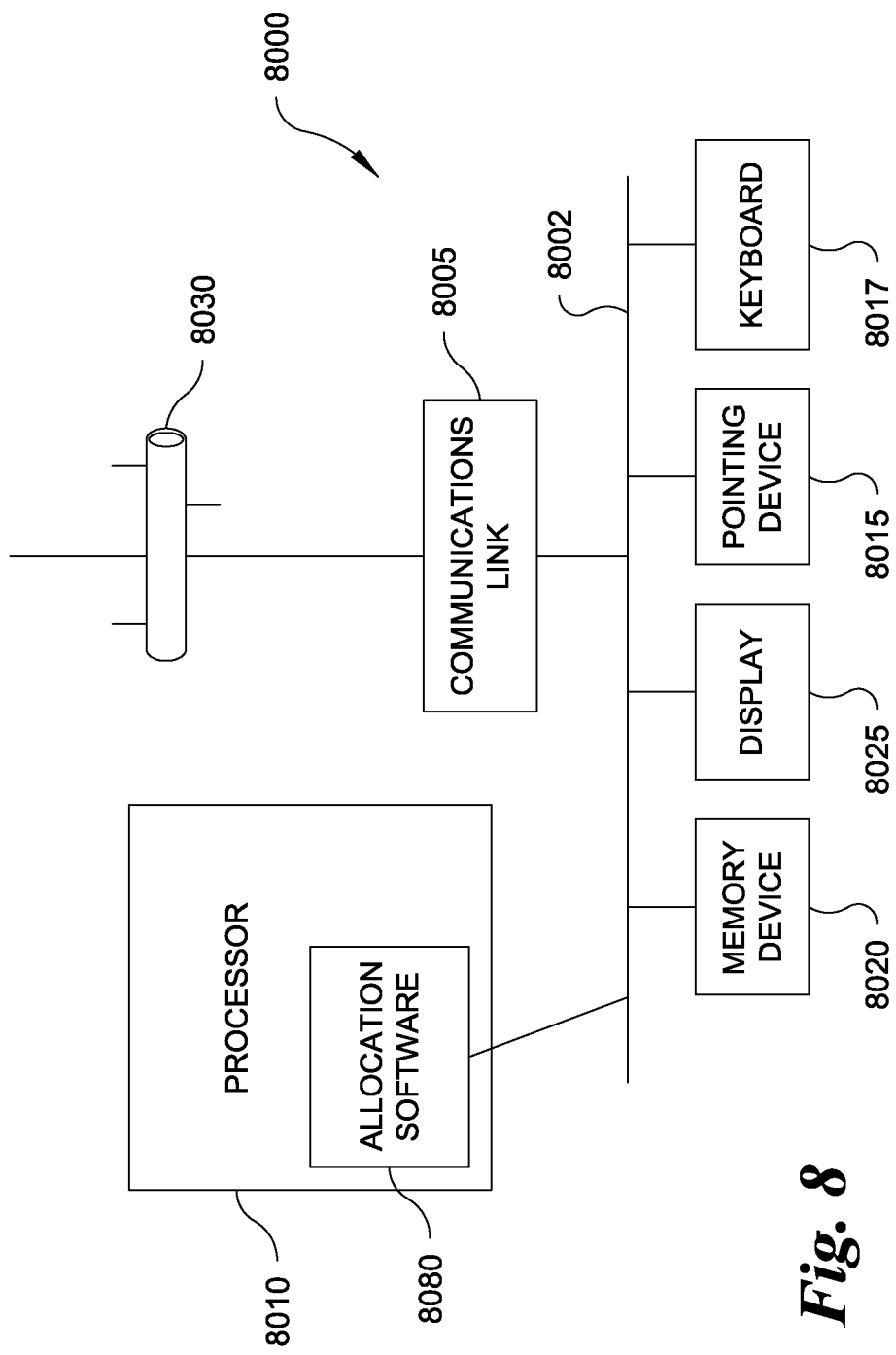
FIG. 8 illustrates an exemplary computer system for use in an embodiment.

Referring to FIG. 8, an exemplary computer system 8000 is shown. Computer system 8000 may be an example of a mainframe that performs the functions indicated at 300 in FIG. 2. Referring again to FIG. 8, in computer system 8000, components are coupled via bus 8002. Processor 8010 executes instructions contained in programs stored on stored media, which may include allocation program 8080. Processor 8010 communicates with communications port 8005 and memory device 8020, receives data from user inputs including pointing device 8015 and keyboard 8017, and provides data for display on display 8025. Memory device 8020 is configured to exchange data with processor 8010, and may store programs containing processor-executable instructions, and values of variables for use by such programs. User interfaces may include workstations having keyboards, touchscreens, pointing devices such as mice, or other user input devices. Communication may be by one or more of suitable communication methods, including over wired or wireless local area networks, including Ethernet 8030 by way of example, and wide area networks, and over communications between networks, including over the Internet. Any suitable data and communication protocols may be employed.

Figure 10:
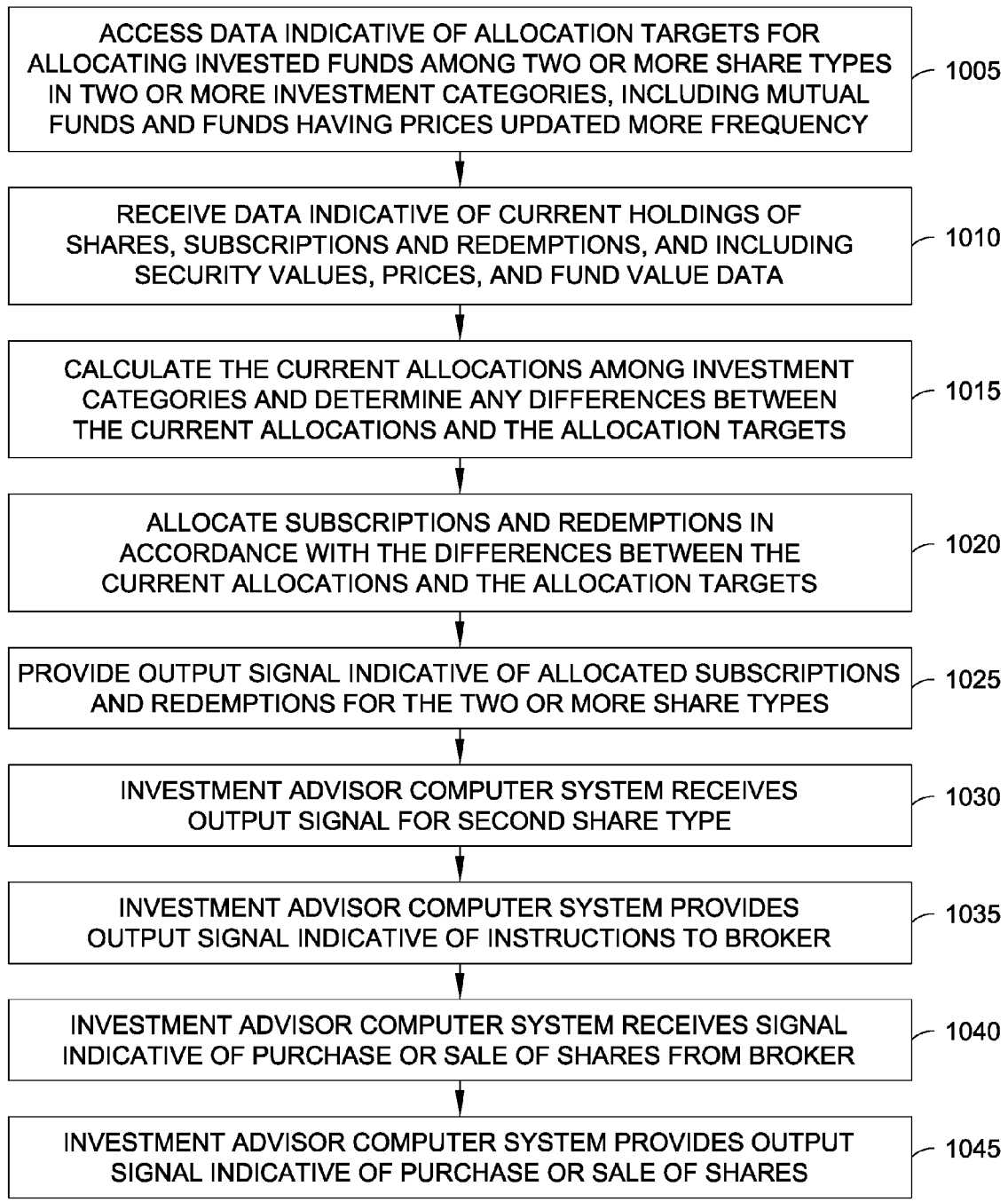
FIG. 10 is a process flow diagram illustrating a process of allocating subscriptions and redemptions in a further embodiment.

In an embodiment, referring to FIG. 10, a processor may access 1005 from a memory storage device data indicative of allocation targets for allocating invested funds among two or more funds in two or more investment categories, involving shares of a first type, such as a mutual fund, which is updated at a first interval, and shares of a second type, the price of which is updated more frequently. The price of the mutual fund shares may be updated at a first interval equal to once a day. The price of the second share type may be updated more frequently than the first interval, such as throughout a trading day. The second share type may be equities, exchange traded funds, or other securities. The processor may receive 1010 data indicative of current holdings of shares, miscellaneous cash flow, shareholder subscriptions and redemptions, and including security values, prices, and fund value data. The processor may calculate 1015 the current allocations among investment categories and determine any differences between the current allocations and the allocation targets. The processor may allocate 1020 subscriptions, which may in an embodiment include miscellaneous cash flow, and redemptions in accordance with the differences between the current allocations and the allocation targets. The processor may provide 1025 an output signal indicative of the allocated subscriptions and redemptions for the first shares and an output signal indicative of allocated subscriptions and redemptions for the second shares. An investment advisor computer system receives 1030 the output signal indicative of the allocated subscriptions and redemptions for the second shares. The investment advisor computer system provides 1035 an output signal indicative of instructions to a broker for purchase or sale of one or more of the second shares. The investment advisor computer system receives 1040 a signal from the broker indicative of transactions for purchase or sale of one or more of the second shares. The investment advisor computer system provides 1045 an output signal indicative of the transactions for purchase or sale of the one or more of the second shares.

Figure 11:
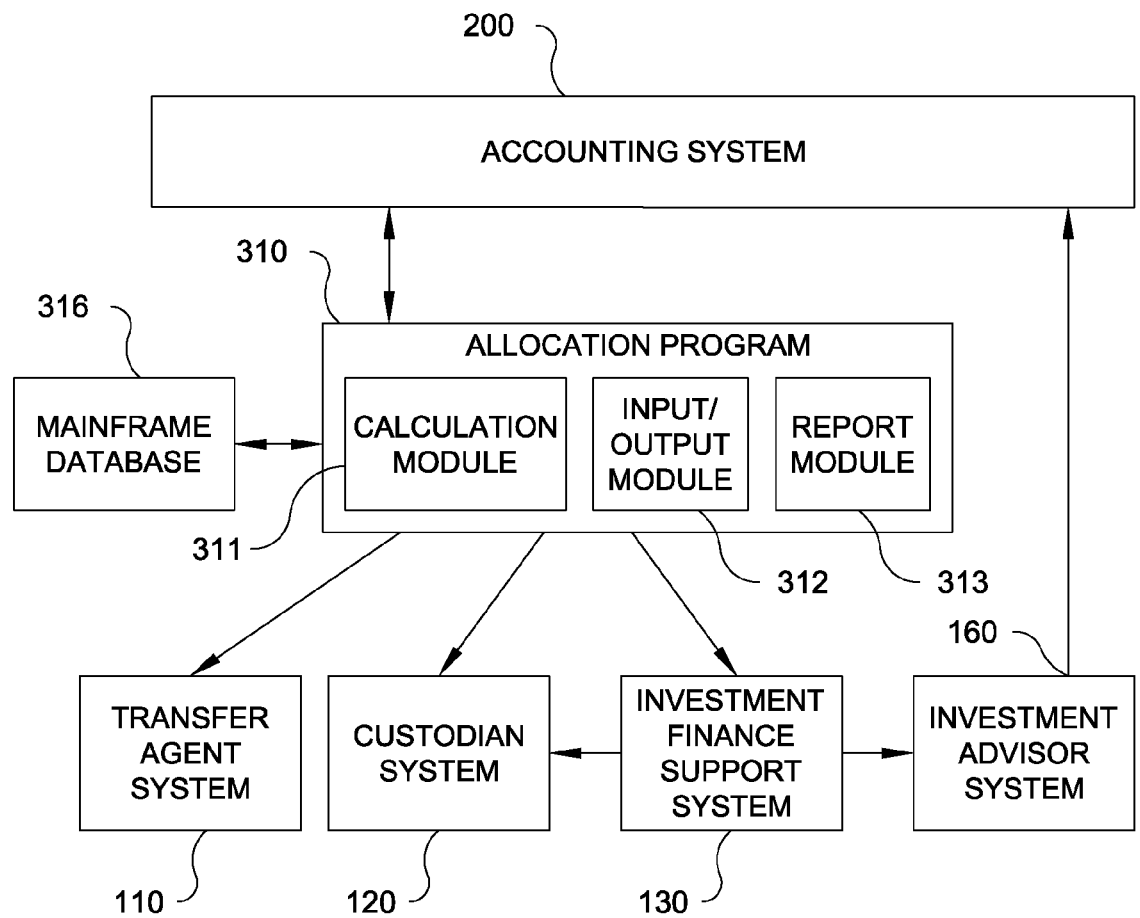
FIG. 11 is a schematic diagram showing software modules in an embodiment of a system.

Referring to FIG. 11, there are shown schematically modules in an exemplary system. Accounting system 200, as noted above, may be implemented by an accounting system computer having a processor executing instructions stored in a computer readable memory. Accounting system 200 provides as its output files that may be stored in memory locations of memory devices of the accounting system computer. Allocation program 310 may run on a mainframe. Allocation program 310 may include a calculation module 311 for executing calculations to determine amounts of sales and purchases of individual funds, an input/output module 312 for communicating with other systems, including by way of example for retrieving files from accounting system 200, retrieving data from and writing to mainframe database 316, and pushing reports to accounting system 200, transfer agent computer system 110, custodian computer system 120, investment finance support computer system 130 and investment advisor computer system 160. Each module may represent separate blocks of code that may be separately loaded and executed by a processor. Investment finance support computer system 130 generates reports that are pushed or retrieved by custodian computer system 120 and investment advisor computer system 160. Investment advisor computer system 160InposeIendInposeIstartInposeIendInposeIstart generates files that are pushed or retrieved by accounting system 200.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of embodiments of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

It will be appreciated that the methods described above may be implemented in one or more computer systems. The steps in the methods may be distributed among more than one processor, may be implemented in part by math co-processors, and may be implemented by more than one core of a processor having multiple cores. Data may be accessed from and stored in more than one memory device.

A system in accordance with an embodiment of the invention may include means corresponding to each step in each method described herein. Each means may be implemented, referring to FIG. 8, by processor 8010 executing instructions contained in programs which may be stored in a storage medium, such as memory device 8020. It will be appreciated that any of the steps in the methods in accordance with embodiments of the invention described herein may be so implemented.

It will be appreciated that references to dollars are references to currency, and that any other currency may be employed in an embodiment.

While the foregoing invention has been described with reference to the above embodiments, various modifications and changes can be made without departing from the spirit of the invention. Accordingly, all such modifications and changes are considered to be within the scope of the invention.

What is claimed is:

1. A computer system for administering investment funds holding shares of mutual funds, comprising:
    a processor;
    a memory storage device in communication with the processor;
    the processor configured to:
    access from the memory storage device data indicative of a percentage allocation target for each of the mutual funds;
    receive data indicative of current holdings of shares, subscriptions representing investments of cash into the investments funds and redemptions representing withdrawals of cash from the investment funds and including security values, prices and mutual fund value data;
    calculate the current allocation for each of the mutual funds and determine any differences between the current allocations and the allocation targets;
    allocate cash from the subscriptions to the mutual funds, each allocation of the cash from the subscriptions to one of the mutual funds providing data indicative of a cash value of shares to be purchased of the mutual fund, commencing with a mutual fund ranked at a greatest level below its target allocation, determine whether cash from the subscriptions remains and, responsive to determining that cash from the subscriptions remains after the allocation to the mutual fund ranked at the greatest level below its target allocation, continue to allocate the subscriptions to mutual funds ranked at successively lower levels below their respective target allocations until the first of all subscriptions are allocated or no further mutual funds are ranked below their respective target allocations;
    allocate the cash to be withdrawn via redemptions to the mutual funds, each allocation of the cash to be withdrawn via redemptions to one of the mutual funds providing data indicative of a cash value of shares of the mutual fund to be sold, commencing with a mutual fund ranked at a greatest level above its target allocation, and, responsive to determining that cash to be withdrawn via redemptions remains after the allocation to the mutual fund ranked at the greatest level above its target allocation, continue to allocate the redemptions to mutual funds ranked at successively lower levels above their respective target allocations until the first of all redemptions are allocated or no further mutual funds are ranked above their respective target allocations.

2. The system of claim 1, wherein the processor is further configured to combine subscriptions and available cash, and to allocate a sum of subscriptions and available cash.

3. The system of claim 1, wherein the processor is further configured to output a report of the allocations of the subscriptions and redemptions.

4. A computer system for administering investment funds holding shares of funds, comprising:
a processor;
a memory storage device in communication with the processor;
the processor configured to:
access from the memory storage device data indicative of allocation targets for allocating invested assets among two or more funds in two or more investment categories; receive data indicative of current holdings of shares, subscriptions representing investments of cash into the investment funds and redemptions representing withdrawals of cash from the investment funds and including security values, prices and fund value data; calculate the current allocations among investment categories and determine any differences between the current allocations and the allocation targets; allocate in a first allocation step one of the cash from the subscriptions and the cash to be withdrawn via the redemptions in accordance with the differences between the current allocations and the allocation targets, and allocate in a second allocation step the other of the cash from the subscriptions and the cash to be withdrawn via the redemptions in accordance with the differences between the current allocations and the allocation targets, each allocation of the cash from the subscriptions to one of the funds providing data indicative of a cash value of shares to be purchased of the fund, and each allocation of the cash to be withdrawn via the redemptions to one of the funds providing data indicative of a cash value of shares of the fund to be sold.

5. The system of claim 4, wherein the processor is further configured to allocate the cash from the subscriptions commencing with a fund ranked at a greatest level below its target allocation.

6. The system of claim 5, wherein the processor is further configured to allocate the cash from the subscriptions to funds ranked at successively lower levels below their respective target allocations until the first of all cash from the subscriptions are allocated or no further funds are ranked below their respective target allocations.

7. The system of claim 4, wherein the processor is further configured to allocate the cash to be withdrawn via the redemptions commencing with a fund ranked at a greatest level above its target allocation.

8. The system of claim 7, wherein the processor is further configured to allocate the cash to be withdrawn via the redemptions to funds ranked at successively lower levels above their respective target allocations until the first of all cash to be withdrawn via the redemptions is allocated or no further funds are ranked above their respective target allocations.

9. The system of claim 4, wherein the data indicative of current holdings of shares, subscriptions and redemptions further comprises directed money movement data, and wherein the processor is configured to process any transactions in accordance with the received directed money movement data prior to calculating the current allocations among investment categories and determining any differences between the current allocations and the allocation targets.

10. The system of claim 9, wherein the processor being configured to process any transactions in accordance with the received directed money movement data comprises being configured to cause a sale of all holdings of a fund.

11. The system of claim 9, wherein the processor being configured to process any transactions in accordance with the received directed money movement data comprises being configured to purchase shares of a fund not held immediately prior to the purchase.

12. The system of claim 4, wherein the two or more funds comprise a first fund having first shares having share values updated at a first interval and a second fund having second shares having share values updated more frequently than the first interval; and wherein the processor is further configured to provide output data indicative of the allocated subscriptions and redemptions for the first fund and output data indicative of allocated subscriptions and redemptions for the second fund;
the system further comprising an investment advisor computer system for receiving the output data indicative of the allocated subscriptions and redemptions for the second fund; providing output data indicative of instructions to a broker for purchase or sale of one or more of the second shares; receiving data signal from the broker indicative of one or more transactions for purchase or sale of one or more of the second shares; and providing output data indicative of the one or more transactions for purchase or sale of the one or more of the second shares.

13. The system of claim 12, wherein the first fund is a mutual fund and the first interval is daily, and the second fund is an exchange traded fund.

14. A computer-implemented method for administering investment funds holding shares of funds, comprising:
accessing by a processor from a memory storage device data indicative of allocation targets for allocating invested funds among two or more funds in two or more investment categories;
receiving by the processor data indicative of current holdings of shares, subscriptions representing investments of cash into the investment funds and redemptions representing withdrawals of cash from the investment funds, and including security values, prices and fund value data;
calculating by the processor current allocations among investment categories and determining any differences between the current allocations and the allocation targets;
allocating by the processor in a first allocation step one of the cash from the subscriptions and the cash to be withdrawn via the redemptions to one or more of the funds held by the investment funds in accordance with the differences between the current allocations and the allocation targets, and allocating in a second allocation step the other of the cash from the subscriptions and the cash to be withdrawn via the redemptions to one or more of the funds held by the investment funds in accordance with the differences between the current allocations and the allocation targets, each allocation of the cash from the subscriptions to one of the funds providing data indicative of a cash value of shares to be purchased of the fund, and each allocation of the cash to be withdrawn via the redemptions to one of the funds providing data indicative of a cash value of shares of the fund to be sold.

15. The method of claim 14, further comprising allocating the cash from the subscriptions commencing with a fund ranked at a greatest level below its target allocation.

16. The method of claim 15, further comprising allocating the cash from the subscriptions to funds ranked at successively lower levels below their respective target allocations until the first of all cash from the subscriptions is allocated or no further funds are ranked below their respective target allocations.

17. The method of claim 14, further comprising allocating the cash to be withdrawn via the redemptions commencing with a fund ranked at a greatest level above its target allocation.

18. The method of claim 17, further comprising allocating the cash to be withdrawn via the redemptions to funds ranked at successively lower levels above their respective target allocations until the first of all cash to be withdrawn via the redemptions is allocated or no further funds are ranked above their respective target allocations.

19. The method of claim 14, wherein the data indicative of current holdings of shares, subscriptions and redemptions further comprises directed money movement data, and further comprising processing any transactions in accordance with the received directed money movement data prior to calculating the current allocations among investment categories and determining any differences between the current allocations and the allocation targets.

20. The method of claim 19, wherein processing any transactions in accordance with the received directed money movement data comprises causing a sale of a selected currency value of shares of a fund.

21. The method of claim 19, wherein processing any transactions in accordance with the received directed money movement data comprises causing a purchase of a selected currency value of shares of a fund.

22. The method of claim 14, wherein the two or more funds comprise a first fund having first shares having share values updated at a first interval and a second fund having second shares having share values updated more frequently than the first interval;
and further comprising:
providing by the processor output data indicative of the allocated subscriptions and redemptions for the first fund and output data indicative of allocated subscriptions and redemptions for the second fund;
receiving by an investment advisor computer system the output data indicative of the allocated subscriptions and redemptions for the second fund;
providing by the investment advisor computer system an output signal indicative of instructions to a broker for purchase or sale of one or more of the second shares;
receiving by the investment advisor computer system a signal from the broker indicative of one or more transactions for purchase or sale of one or more of the second shares; and
providing by the investment advisor computer system an output signal indicative of the one or more transactions for purchase or sale of the one or more of the second shares.

23. The method of claim 22, wherein the first fund is a mutual fund and the first interval is daily, and the second fund is an exchange traded fund.

24. A computer system for administering investment funds holding shares of funds, comprising:
a processor;
a memory storage device in communication with the processor;
the processor configured to:
access from the memory storage device data indicative of allocation targets for allocating invested funds among two or more funds in two or more investment categories; receive data indicative of current holdings of shares, subscriptions representing investments of cash into the investment funds and redemptions representing withdrawals of cash from the investment funds, and including security values, prices, fund value data, and directed money movement data; process any transactions in accordance with the received directed money movement data; calculate the current allocations among investment categories and determine any differences between the current allocations and the allocation targets; and allocate cash from the subscriptions and cash to be withdrawn via the redemptions to the two or more investment categories to provide, based on the allocation of cash from the subscriptions, a cash value of fund shares to be purchased in at least one of the investment categories and, based on the allocation of cash to be withdrawn via the redemptions, a cash value of fund shares to be sold in another of the investment categories in accordance with the differences between the current allocations and the allocation targets.

25. The system of claim 24, wherein the processor being configured to allocate subscriptions and redemptions in accordance with the differences between the current allocations and the allocation targets comprises the processor being configured to determine net redemptions or net subscriptions and allocate the determined net redemptions or net subscriptions in accordance with the differences between the current allocations and the allocation targets.

26. The system of claim 24, wherein the processor is configured to calculate the current allocations among investment categories and determine any differences between the current allocations and the allocation targets after processing any transactions in accordance with the received directed money movement data.

27. A computer system for administering investment funds holding shares of funds, the funds including first shares of first funds having share values updated at a first interval and second shares of second funds having share values updated more frequently than the first interval, comprising:
a processor;
a memory storage device in communication with the processor;
the processor configured to:
access from the memory storage device data indicative of allocation targets for allocating invested funds among two or more funds in two or more investment categories; receive data indicative of current holdings of shares, subscriptions representing investments of cash into the investment funds and redemptions representing withdrawals of cash from the investment funds; and including security values, prices, and fund value data; calculate the current allocations among investment categories and determine any differences between the current allocations and the allocation targets; allocate cash from the subscriptions and cash to be withdrawn via the redemptions in accordance with the differences between the current allocations and the allocation targets; provide output data indicative of the allocated cash from the subscriptions and cash to be withdrawn via the redemptions for the first shares and output data indicative of allocated cash from the subscriptions and cash to be withdrawn via the redemptions for the second shares, each allocation of the cash from the subscriptions to one of the investment categories providing data indicative of a cash value of shares to be purchased in the investment category, and each allocation of the cash to be withdrawn via the redemptions to one of the investment categories providing data indicative of a cash value of shares to be sold in the investment category;

the system further comprising an investment advisor computer system for receiving the output data indicative of the allocated subscriptions and redemptions for the second shares; providing output data indicative of instructions to a broker for purchase or sale of one or more of the second shares; receiving data from the broker indicative of transactions for purchase or sale of one or more of the second shares; providing output data indicative of the transactions for purchase or sale of the one or more of the second shares.

28. The system of claim 27, wherein the output data indicative of instructions to the broker for purchase or sale of one or more of the second shares comprises instructions for purchase of one or more of the second shares and an amount of currency allocated for the purchase.

29. The system of claim 28, wherein the processor is further configured to store in memory an amount of currency earmarked for purchase of one or more of the second shares.

\* \* \* \* \*